(12) United States Patent
Fernandes

(10) Patent No.: US 7,330,597 B2
(45) Date of Patent: Feb. 12, 2008

(54) IMAGE COMPRESSION

(75) Inventor: Felix Fernandes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 866 days.

(21) Appl. No.: 10/719,281

(22) Filed: Nov. 21, 2003

(65) Prior Publication Data

US 2004/0120592 A1    Jun. 24, 2004

Related U.S. Application Data

(60) Provisional application No. 60/428,422, filed on Nov. 22, 2002.

(51) Int. Cl.
*G06K 9/36*    (2006.01)

(52) U.S. Cl. .................................. 382/240; 382/276
(58) Field of Classification Search ................ 382/232, 382/233, 235, 240, 248, 276, 277–281
See application file for complete search history.

(56) References Cited

U.S. PATENT DOCUMENTS 5,748,786 A * 5/1998 Zandi et al. ................ 382/240
7,046,854 B2 * 5/2006 Daniell ....................... 382/235

* cited by examiner

*Primary Examiner*—Duy M. Dang
(74) *Attorney, Agent, or Firm*—Wade James Brady, III; Frederick J. Telecky, Jr.

(57) ABSTRACT

A method of image compression with non-redundant complex wavelet transforms applied using a triband decomposition. Variant transforms for real and complex inputs allow for elimination of redundancy.

13 Claims, 9 Drawing Sheets

IMAGE COMPRESSION

CROSS REFERENCE TO RELATED APPLICATIONS

This application claims priority from the following provisional patent application: application Ser. No.: 60/428,422, filed Nov. 22, 2002.

BACKGROUND OF THE INVENTION

This invention relates to image compression, and more particularly, to image and video compression methods and devices.

Recently, Digital Still Cameras (DSCs) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSPs) has led to the development of DSCs that have the resolution and quality offered by traditional film cameras. These DSCs offer several additional advantages compared to traditional film cameras in terms of data storage, manipulation, and transmission. The digital representation of captured images enables the user to easily incorporate the images into any type of electronic media and transmit them over any type of network; see FIG. 10. The ability to instantly view and selectively store captured images provides the flexibility to minimize film waste and instantly determine if the image needs to be captured again. With its digital representation the image can be corrected, altered, or modified after its capture, and stored on memory cards for battery-powered cameras.

Further, DSCs can be extended to capture video clips (short video sequences) and to compress (sequences of) images with methods such as JPEG or JPEG2000. FIGS. 9a-9b depict functions and blocks of a digital camera system with the image compression block providing JPEG, JPEG2000, and/or other compressions. JPEG provides compression by transforming 8×8 blocks of pixels into the frequency domain with an 8×8 DCT (discrete cosine transform) and then quantizing the DCT coefficient blocks, scanning the 8×8 quantized coefficients into a one-dimensional sequence, and variable length coding (VLC) the sequence.

In contrast to JPEG, JPEG2000 uses wavelet decomposition with both lossy and lossless compression enables progressive transmission by resolution (which can generate a small image from the code for the full size image), and facilitates scalable video with respect to resolution, bit-rate, color component, or position with transcoding by using Motion JPEG2000. Indeed, FIGS. 11a-11b illustrate JPEG2000 image analysis with a three-level wavelet decomposition indicated in the lower right portion of FIG. 11b. Also, Christopoulos et al, The JPEG2000 Still Image Coding System: an Overview, 46 IEEE Tran.Cons.Elect. 1103 (2000).

However, the real wavelet transforms used in JPEG2000 suffer from three shortcomings: (i) lack of shift invariance, (ii) lack of directionality, and (iii) lack of explicit phase information. Complex wavelet transforms, in which the real and imaginary parts of the transform coefficients are an approximate Hilbert-transform pair, offer solutions to these three shortcomings. This enables efficient statistical models for the coefficients that are also geometrically meaningful. Indeed, there are distinct relationships between complex coefficient magnitudes and phases, and edge orientations and positions, respectively. These relationships allows development of an effective hidden Markov tree model for the complex wavelet coefficients; for example see Choi et al, Hidden Markov Tree Modeling of Complex Wavelet Transforms, 2000 IEEE ICASSP 133. Unfortunately, the success of geometric modeling in complex wavelet coefficients has been limited to the class of redundant, or over-complete, complex transforms. This redundancy complicates any application to problems such as image/video compression for DSCs and for wireless-linked Internet transmission where parsimonious signal representations are critical.

To address the redundancy problem, Fernandes et al, A New Directional, Low-Redundancy, Complex-Wavelet Transform, 2001 IEEE ICASSP 3653 provided a low redundancy by projection and negative frequency discard. Subsequently, Fernandes introduced the Non-Redundant Complex Wavelet Transforms (NCWT); see for example, Fernandes et al, A New Framework for Complex Wavelet Transforms, 51 *IEEE Trans. Signal Proc.* 1825 (2003). But this implementation can be viewed as a combination of a downsampled positive-frequency projection filter with a traditional dual-band real wavelet transform. Therefore, at the finest scale, the complex wavelet transform has resolution 4x lower than the real input signal. These NCWTs do enjoy directionality and explicit phase information because of the approximate Hilbert-transform relationship between real and imaginary parts of their transform coefficients. To date, however, they have been significantly less amenable to geometric modeling than their redundant counterparts.

T. D. Tran et al, Linear-Phase Perfect Reconstruction Filter Bank: Lattice Structure, Design, and Application in Image Coding, 48 *IEEE Trans. Signal Proc.* 133 (2000) discloses general methods of filter bank design.

SUMMARY OF THE INVENTION

The invention provides a separable two-dimensional non-redundant complex wavelet image transform using one-dimensional triband transforms. Preferred embodiments include constituent filter designs.

This has advantages including reduction in encoding memory use while maintaining complex wavelet properties.

DESCRIPTION OF THE PREFERRED EMBODIMENTS

1. Overview

Figure 1:
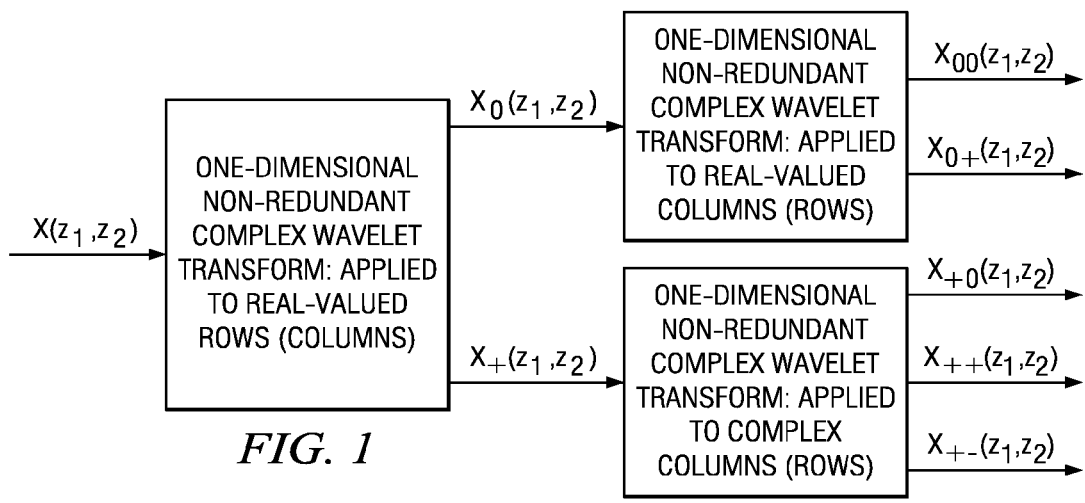
FIG. 1 shows a preferred embodiment method.
Figure 2A:
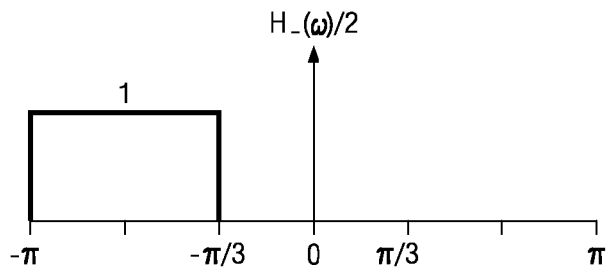
FIGS. 2a-2c show constituent filter magnitudes.
Figure 2B:
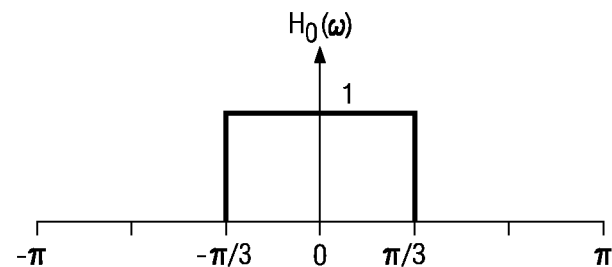
Figure 2C:
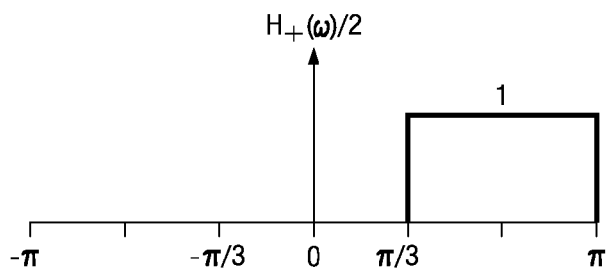
Figure 3A:
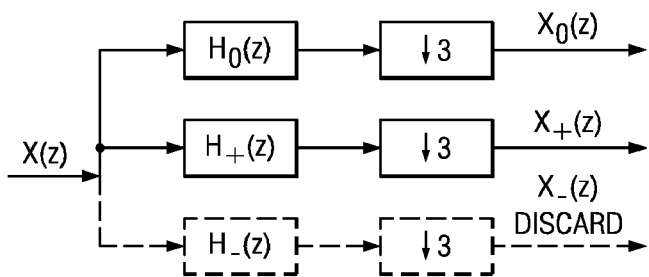
FIGS. 3a-3d are one-dimensional filter structures.
Figure 3B:
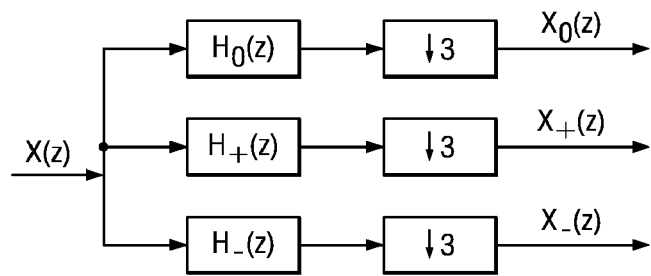

The preferred embodiment image compression methods efficiently encode (sequences of) images by successive applications of a one-dimensional, non-redundant, triband (three output subbands) complex wavelet decomposition with some negative frequency discards as illustrated in FIG. 1. FIGS. 3a-3b show the filter banks used in FIG. 1, and FIGS. 2a-2c show the idealized frequency responses of the three subband filters of FIGS. 3a-3b.

Figure 4A:
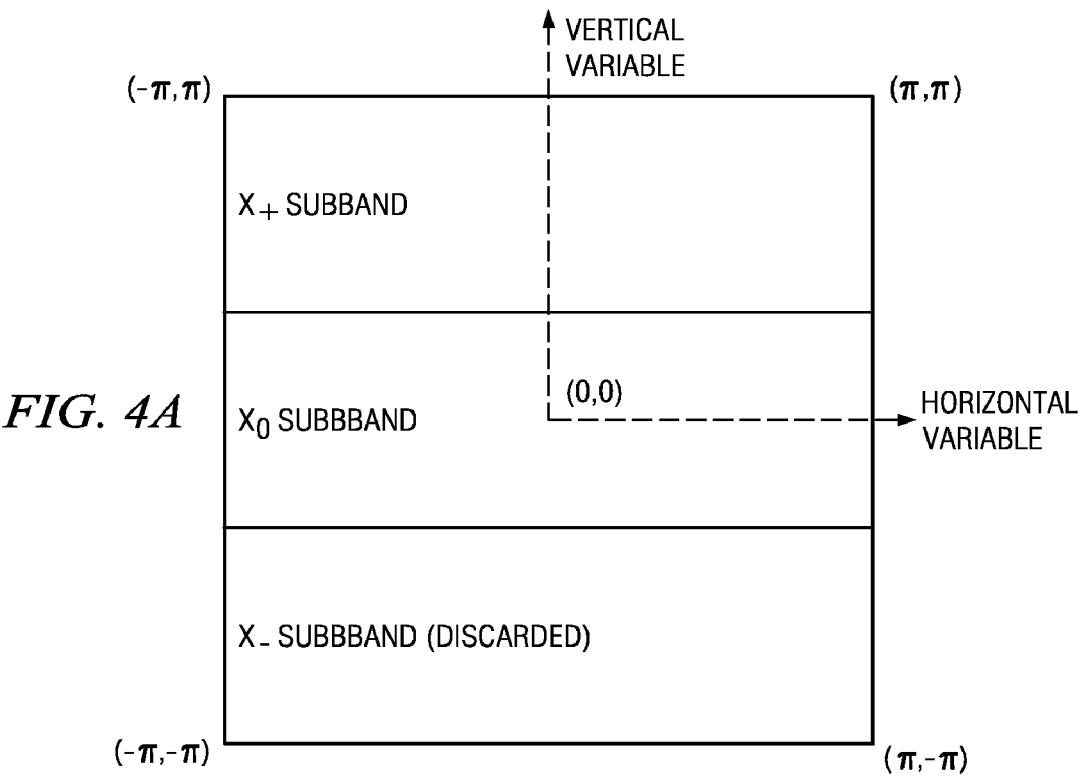
FIGS. 4a-4b illustrate the preferred embodiment two-dimensional transform in the frequency domain.
Figure 4B:
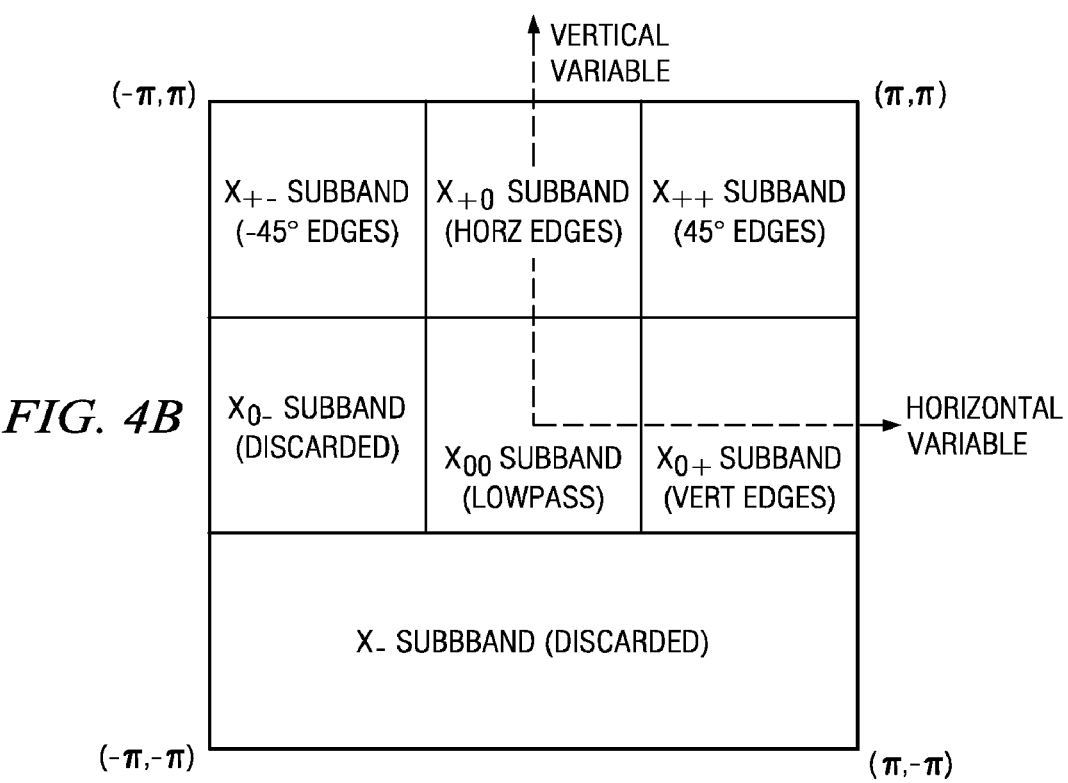

FIGS. 4a-4b show the ideal consequent two-dimensional frequencies involved in the applications of the one-dimensional transforms of FIG. 1; namely, FIG. 4a shows frequencies after the vertical variable filtering step and FIG. 4b shows the frequencies after the two horizontal variable filtering steps.

Figure 6A:
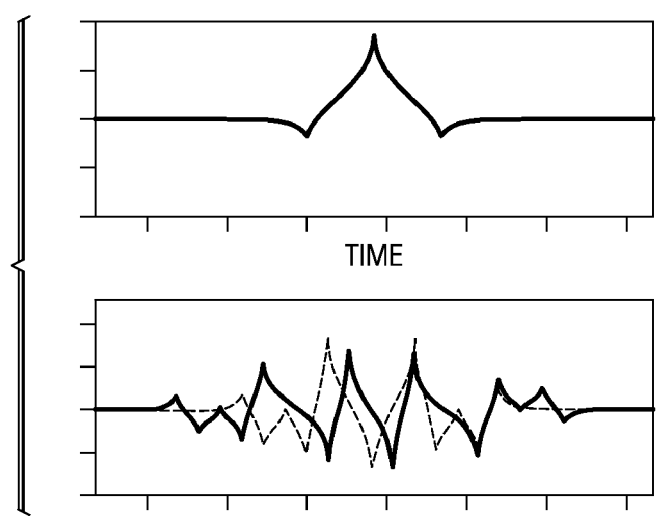
FIGS. 6a-6c show preferred embodiment scaling function and complex wavelet and corresponding filter frequency dependencies.
Figure 6B:
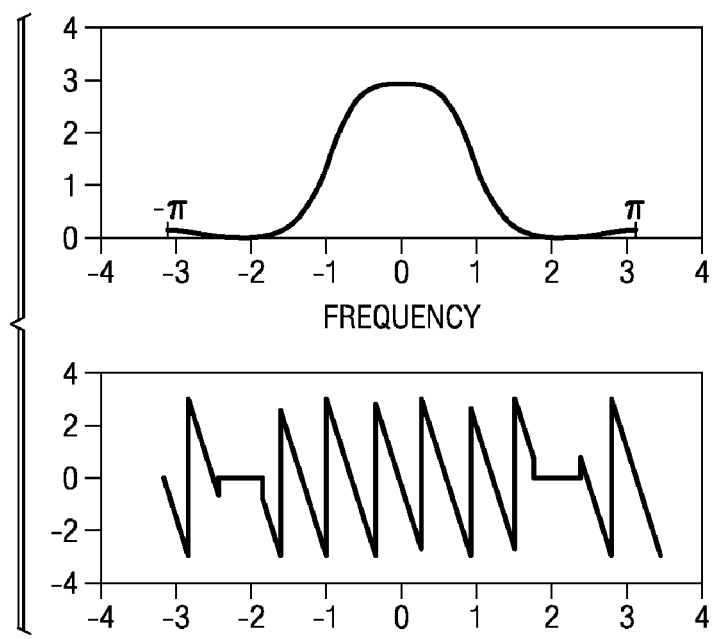
Figure 6C:
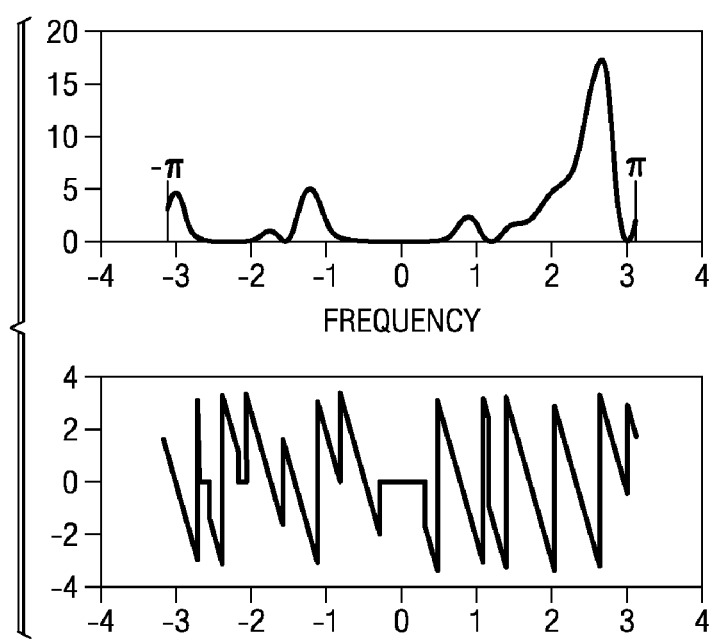
Figure 7A:
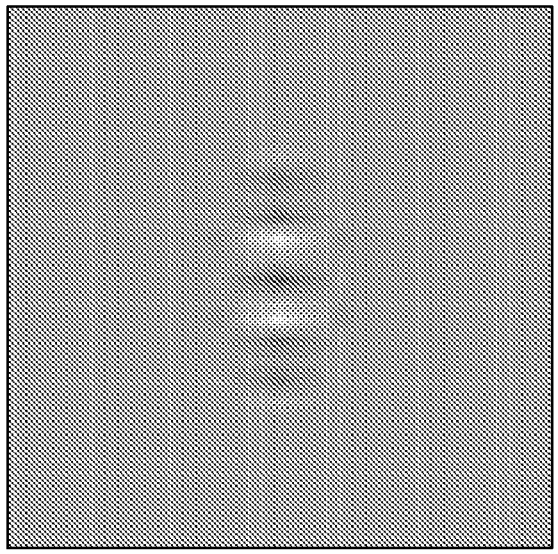
FIG. 7 illustrates two-dimensional complex wavelet basis functions (imaginary parts).
Figure 7B:
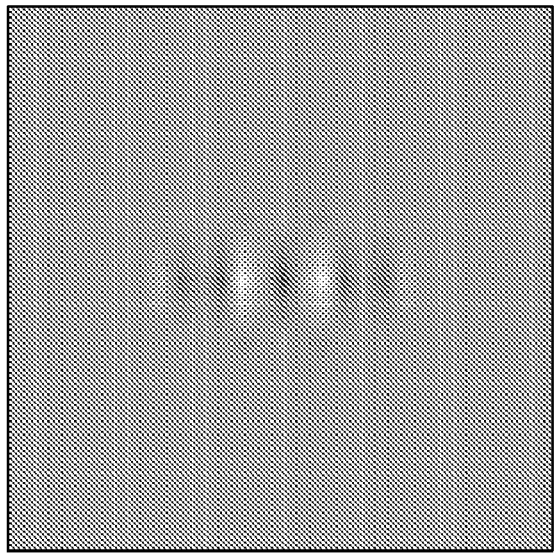
Figure 7C:
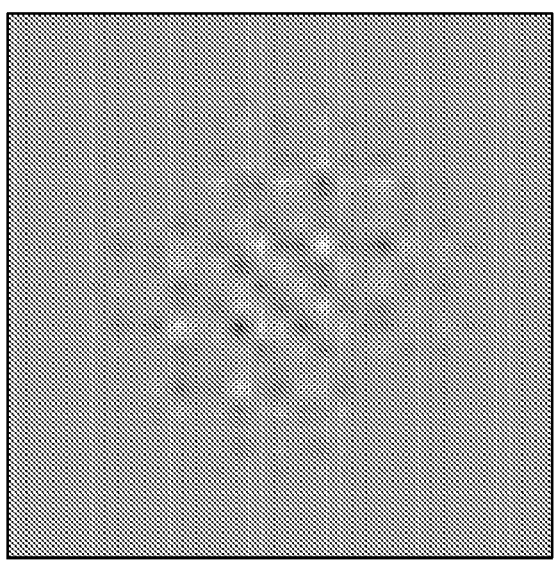
Figure 7D:
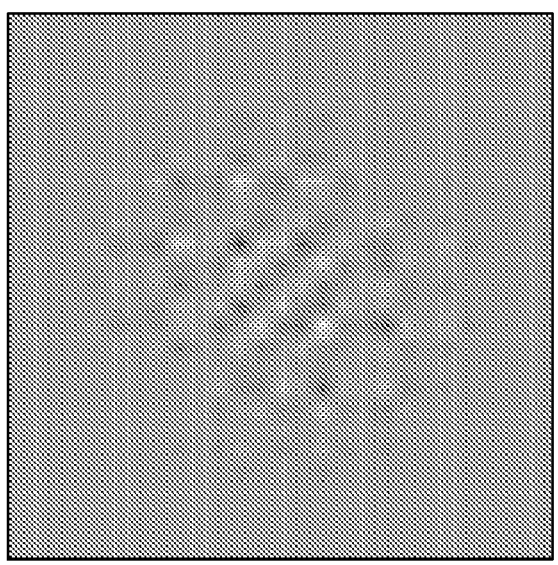

Preferred embodiment implementations of the subband filters include a parameterization approach and a lifting approach. In particular, FIGS. 6b-6c show the frequency responses (magnitude and phase) of the lowpass and the positive-frequency highpass subband filters of a preferred embodiment implementation using a parameterization approach. FIG. 6a shows the corresponding preferred embodiment scaling function and complex wavelet.

Figure 9A:
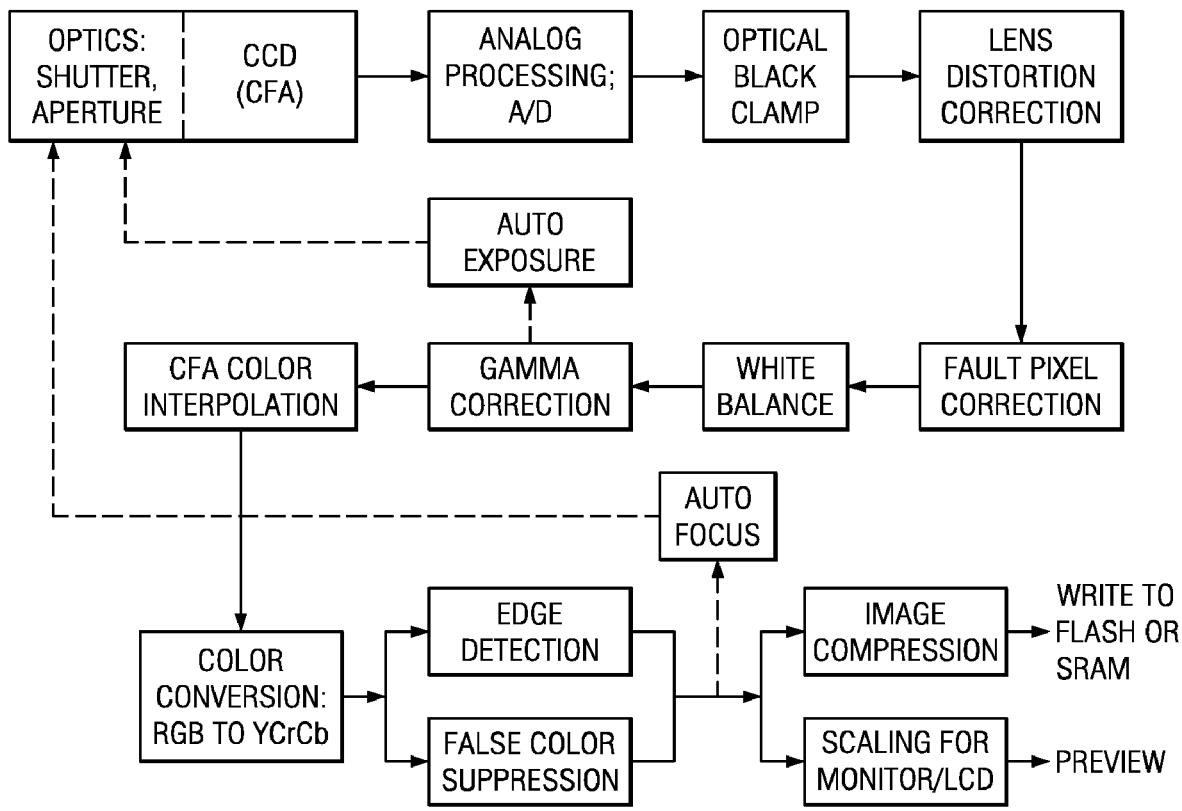
FIGS. 9a-9b show digital camera functions and blocks.
Figure 9B:
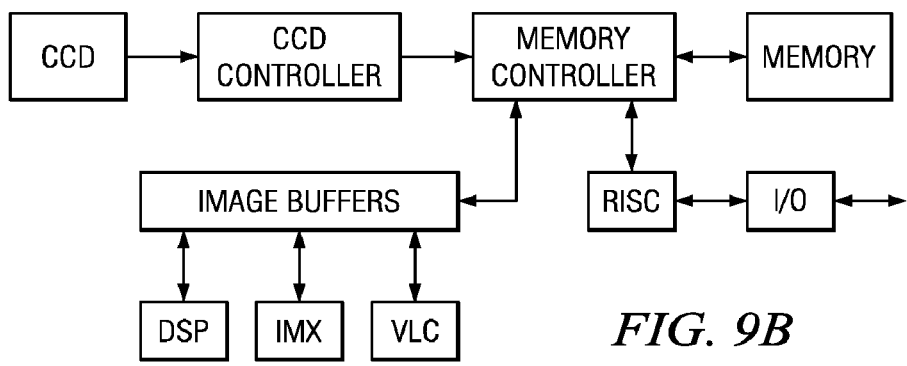
Figure 11A:
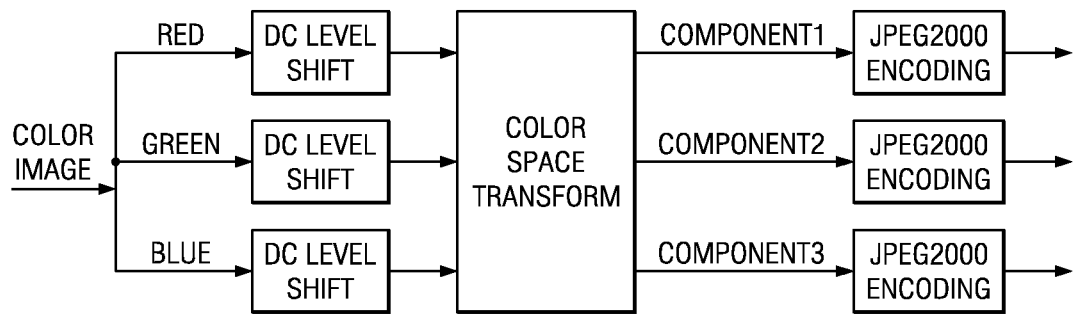
FIGS. 11a-11b illustrate JPEG2000.
Figure 11B:
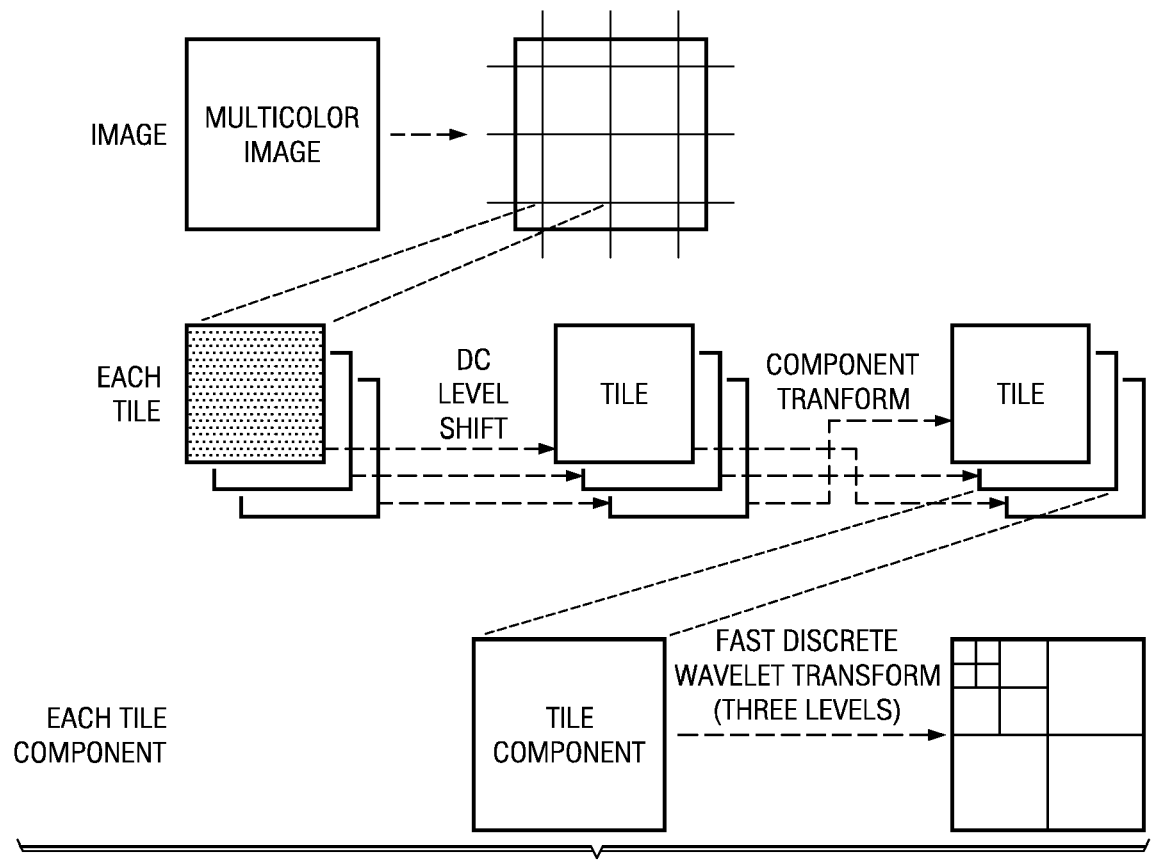

FIGS. 9a-9b illustrate a digital camera which has the DSP and/or IMX (image coprocessor) to compute the complex wavelet transform coefficients. The input and encoded output images are stored in the memory.

The preferred embodiment linear-phase, semi-orthogonal, directional NCWT design uses a triband (downsample by 3) filter bank which permits a natural, direct NCWT implementation using complex wavelet filters and a real scaling filter. At the finest scale, the resulting complex wavelet transform has resolution 3x lower than the real input signal. The preferred embodiment design has properties (directionality, magnitude coherence, and phase coherence) that may make the two-dimensional non-redundant coefficients amenable to geometric modeling.

2. Two-Dimensional Non-Redundant Complex Wavelet Transform

FIG. 1 illustrates the steps of a first preferred embodiment method of two-dimensional, non-redundant complex wavelet transformation as separable and using one-dimensional triband filtering of (the z-transform of) an input image. The (highpass) negative frequencies of the first one-dimensional transform are discarded as illustrated in FIG. 4a, and the (highpass) negative frequencies of the second transform on the lowpass subband are also discarded as illustrated in FIG. 4b; this eliminates redundancy. In effect, the lowpass (scaling function) is a real transform, and the highpass (complex wavelet function) has redundancy due to the complex conjugate symmetry for real input, so negative frequencies can be discarded. Of course, by symmetry, positive frequencies could have been discarded and negative frequencies retained.

In more detail, presume an input N×M image, $x(n,m)$, with $0 \leq n < N$ and $0 \leq m < M$ and two-dimensional z-transform $X(z_1, z_2)$. The first preferred embodiment method (FIG. 1) uses the two one-dimensional triband non-redundant complex wavelet transforms shown as filter banks in FIGS. 3a-3b. The preferred embodiment method applies the transform of FIG. 3a to real-valued inputs: first to $X(z_1, z_2)$ with respect to the second variable and then to the first stage lowpass output, $X_0(z_1, z)$, with respect to the first variable; while it applies the transform of FIG. 3b to complex-valued input: the positive frequencies of the highpass output of the first stage, $X_+(z_1, z)$. $H_0(z)$, $H_+(z)$, and $H_-(z)$, are the z-transforms of the ideal impulse responses for the three subband filters, and FIGS. 2a-2c show the magnitudes for ideal filters; the actual filters will be constructed below. $H_0(z)$ is taken to be real-valued while $H_+(z)$ and $H_-(z)$ are complex conjugates.

Figure 3C:
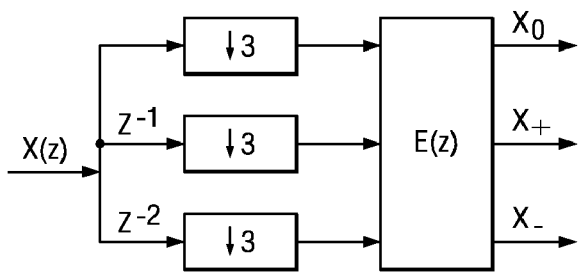

Consider FIG. 1: first apply the one-dimensional transform of FIG. 3a on the vertical (second) variable of $X(z_1, z_2)$ to obtain a real-valued, (not-yet-downsampled) lowpass subband $H_0(z_2) X(z_1, z_2)$ plus a complex-valued, (not-yet-downsampled) highpass positive-frequencies subband $H_+(z_2) X(z_1, z_2)$. The frequency-domain support of these subbands is depicted in FIG. 4a where the frequency, $\omega$, as usual is related to z by $z=|z|e^{j\omega}$ and thus $X(e^{j\omega 1}, e^{j\omega 2})$ is the Fourier transform of $x(n,m)$. Redundancy considerations justify the elimination of the subband $H_-(z_2)X(z_1, z_2)$ (which downsamples to $X_-(z_1, z)$) because $H_-(z_2)$ is just the complex conjugate of $H_+(z_2)$ and $X(z_1, z_2)$ is real-valued. Then downsample (in spatial domain) by a factor of 3 with respect to the second variable to yield z-transforms $X_0(z_1, z)$ and $X_+(z_1, z)$. Note that $H_0(z_2)X(z_1, z_2)$ has support (ideally) in the range $[-\pi/3, \pi/3]$ and $H_+(z_2)X(z_1, z_2)$ has support (ideally) in the range $[\pi/3, \pi]$, so aliasing can be avoided in the downsampling by 3. Generally, downsampling by 3 converts z-transform $Y(z)$ into z-transform $Y(z^{1/3})+Y(z^{1/3} e^{-j2\pi/3})+Y(z^{1/3} e^{-j4\pi/3})$, but in practice the filter banks are implemented as polyphase filters as illustrated in FIG. 3c and described in the next section.

Complete the FIG. 1 method by performing two different one-dimensional transforms along the horizontal (first) variable of the subbands $X_0(z_1, z)$ and $X_+(z_1, z)$. Because the subband $X_0(z_1, z)$ contains real-valued transform coefficients, apply the transform of FIG. 3a, thereby obtaining two output subbands (not-yet-downsampled): real-valued lowpass subband $H_0(z_1) X_0(z_1, z)$ plus complex-valued highpass-positive-frequencies subband $H_+(z_1) X_0(z_1, z)$. Then again downsample (in spatial domain) by a factor of 3 with respect to the first variable to yield $X_{00}(z', z)$ and $X_{0+}(z', z)$. Again, $H_0(z_1)X_0(z_1, z)$ has support (ideally) in the range $[-\pi/3, \pi/3]$ and $H_+(z_1)X_0(z_1, z)$ has support (ideally) in the range $[\pi/3, \pi]$, so aliasing-free downsampling by a factor of 3. This downsampling yields subbands $X_{00}(z', z)$ and $X_{0+}(z', z)$. Once again, the subband $X_{0-}(z',z)$ is discarded because it is redundant due to the real-valued input.

Finally, apply the FIG. 3b transform to the complex coefficients of the $X_+(z_1, z)$ subband to obtain three output subbands: $H_0(z_1)X_+(z_1,z)$, $H_+(z_1)X_+(z_1,z)$, and $H_-(z_1)X_+(z_1, z)$. Then again downsample by a factor of 3 to yield $X_{+0}(z', z)$, $X_{++}(z', z)$, and $X_{+-}(z', z)$, respectively. Again, the filterings typically are implemented as polyphase filter banks and the non-ideal frequency responses (e.g., FIGS. 6b-6c) will result in some aliasing.

The first level of preferred embodiment two-dimensional NCWT is now complete. The five output subbands ideally partition the (prior-to-downsampling) frequency domain as shown in FIG. 4b. This transform has higher directionality than the real wavelet transform, because the latter transform cannot differentiate between features oriented at 45 and −45 degrees. Subsequent levels of the transform are obtained by recursively transforming the lowpass subband $X_{00}(z', z)$. The two-dimensional NCWT is easily inverted by applying the appropriate one-dimensional synthesis filter banks along the columns and rows of the two-dimensional transform coefficients. The following section describes design of the one-dimensional NCWTs of FIGS. 3a-3b.

3. One-Dimensional Filter Banks for Complex Inputs

FIG. 3b shows the three-band analysis filter bank that performs the first level of a non-redundant complex wavelet decomposition of $X(z)$, the z-transform of $x(n)$, a complex-valued input signal. $H_0(z)$ has real filter coefficients while $H_+(z)$ and $H_-(z)$ have complex filter coefficients such that $H_+(z)^* = H_-(z)$, which signifies that the $H_+(z)$ filter coefficients are complex conjugates of the $H_-(z)$ filter coefficients. The idealized magnitude responses of these filters are shown in FIGS. 2a-2c. Provided that $H_0(z)$ satisfies certain existence conditions, $X_0(z)$ represents a scaling-coefficient sequence while $X_+(z)$ and $X_-(z)$ represent wavelet-coefficient sequences. Because both $|H_+(\omega)|$ and $|H_-(\omega)|$ have one-sided magnitude responses (FIGS. 2a, 2c), each of the wavelet coefficient sequences $X_+(z)$ and $X_-(z)$ exhibits a Hilbert-transform relationship between their real and imaginary parts. This property will enable directionality and explicit phase information in the two-dimensional NCWT. The following argument shows that the decomposition provided by FIG. 3b is non-redundant. Let the input signal $x(n)$ consist of N complex numbers. Then due to the decimation in each subband, the subband signals $x_0(n)$, $x_+(n)$, and $x_-(n)$ each has N/3 complex coefficients. Since the input and the transform coefficients each require the same amount of storage space (for N complex numbers), the transform is non-redundant. Implementations of the analysis filter bank in FIG. 3b must address the following five design constraints.

1. The frequency responses of the analysis filters must approximate the idealized magnitude responses in FIGS. 2a-2c.
2. To ensure that the one-dimensional NCWT for real inputs is nonredundant, require $H_+(z)^* = H_-(z)$.
3. To obtain smooth wavelet basis functions, $H_0(z)$ must satisfy existence and vanishing-moment conditions.
4. For image/video compression applications, the $H_0(z)$, $H_+(z)$, and $H_-(z)$ filter bank should be linear-phase and orthogonal.
5. A synthesis filter bank that reconstructs $X(z)$ from the subband signals $X_0(z)$, $X_+(z)$, and $X_-(z)$ must exist.

Multi-band filter bank design is a difficult problem, and no direct design method satisfies all the above criteria simultaneously. Therefore, some preferred embodiments adopt the a parameterization approach and other preferred embodiments use a lifting approach to design the analysis filter bank. Preliminarily, note that practical filter bank implementation typically uses the polyphase filter approach illustrated in FIG. 3c. The polyphase matrix $E(z)$ would have a first row consisting of the three polyphase components of $H_0(z)$, a second row consisting of the three polyphase components of $H_+(z)$, and a third row consisting of the three polyphase components of $H_-(z)$. In particular, $H_0(z)$ is a polynomial in z and the $0^{th}$, $1^{st}$, and $2^{d}$ polyphase components are just the terms of $H_0(z)$ which have a power of z equal, modulo 3, to 0, −1, and −2, respectively. Thus the three elements of the first row of $E(z)$ are the z-transforms of the three phases of the impulse response $h_0(n)$. Similarly for the second and third rows.

Parameterization Approach

First, follow Tran et al. (see Background cite) to specify a length-9, 3-band, orthogonal, linear-phase, real-coefficient filter bank. Then exploit the free parameters to impose two vanishing moments on the scaling filter. Let $\hat{E}(z)$ denote the polyphase matrix of the analysis filter bank of real-valued filters in the resulting system.

Next, define $$C = \begin{bmatrix} 1 & 0 & 0 \\ 0 & 1/\sqrt{2} & j/\sqrt{2} \\ 0 & 1/\sqrt{2} & -j/\sqrt{2} \end{bmatrix} \text{ and } S = \begin{bmatrix} 1 & 0 & 0 \\ 0 & \cos\theta & \sin\theta \\ 0 & -\sin\theta & \cos\theta \end{bmatrix}$$

Now, the first, second, and third rows of the polyphase matrix $C\hat{E}(z)$ are to contain the preferred embodiment polyphase components for $H_0(z)$, $H_+(z)$, and $H_-(z)$, respectively. Note that C essentially combines the two real-valued filters, $H_1(z)$, and $H_2(z)$, from the Tran et al construction into the complex conjugate pair $H_+(z)$ and $H_-(z)$. These analysis filters satisfy all preceding constraints except for Constraint 1, which is violated because the magnitude responses $|H_+(\omega)|$ and $|H_-(\omega)|$ differ from the idealized responses in FIGS. 2a, 2c. To satisfy Constraint 1, improve the wavelet-filter magnitude responses by introducing free optimization parameters without violating the other constraints. Therefore, define $$U(z) = \begin{bmatrix} z^{-1} & 0 & 0 \\ 0 & z^{-1} & u(1-z^{-2}) \\ 0 & 0 & z^{-1} \end{bmatrix} \text{ and } V(z) = \begin{bmatrix} z^{-1} & 0 & 0 \\ 0 & z^{-1} & 0 \\ 0 & v(1-z^{-2}) & z^{-1} \end{bmatrix}$$

and generate a new analysis filter bank with polyphase matrix $E(z)$ defined by $E(z) = CV(z)U(z)S\hat{E}(z)$. Observe that the entries in the first rows of C, S, $U(z)$, $V(z)$ guarantee that the scaling filter specified by $E(z)$ is the same (modulo shifts) as the scaling filter specified by $\hat{E}(z)$. Hence, Constraint 3 is still satisfied by the $E(z)$ system. Now, S introduces the free parameter $\theta$ into $E(z)$ without affecting Constraint 4 because S is orthogonal and also preserves linear phase. Next, consider the matrices $U(z)$ and $V(z)$. These are left-extension matrices that lengthen the wavelet filters by introducing free parameters u and v into the analysis filter bank while preserving linear phase. However, orthogonality of the wavelet filters is not preserved by these matrices. The zeros in the first rows and first columns of the left-extension matrices ensure that the the scaling filter specified by $V(z)U(z)S\hat{E}(z)$ is orthogonal to its own shifts as well as to shifts of the wavelet filters, although the wavelet filters are not orthogonal to their own shifts. Thus, in addition to semi-orthogonality, the basis associated with the $V(z)U(z)S\hat{E}(z)$ system also has orthogonal scaling functions. Therefore, the $V(z)U(z)S\hat{E}(z)$ filter bank satisfies a weakened form of Constraint 4 in which "orthogonal" is replaced by "semi-orthogonal and $H_0(z)$ should be shift-orthogonal." Note that the scaling filter and two wavelet filters associated with the $V(z)U(z)S\hat{E}(z)$ system have lengths 9, 15, and 21, respectively, because the $U(z)$ and $V(z)$ lengthen the original length-9 $\hat{E}(z)$ system. Finally, the matrix C is introduced to transform the real-coefficient polyphase matrix $V(z)U(z)S\hat{E}(z)$ into $E(z)$, the second and third rows of which specify complex-coefficient filters $H_+(z)$ and $H_-(z)$ that satisfy Constraint 2. Optimizing over the real-valued, free parameters $\theta$, u, v, yields $E(z)$ with wavelet-filter magnitude responses that have minimum mean-squared error with respect to the idealized responses in FIGS. 2a, 2c. With superscript H denoting the Hermitian conjugate (complex conjugate plus transpose), the polyphase matrix for the synthesis filter bank corresponding to $E(z)$ is given by $R(z) = \hat{E}^H(z^{-1})S^H U(z^{-1})V$ $(z^{-1})C^H$ because $\hat{E}^H(z)$, S, and C are paraunitary and $U(z)^{-1}=U(z^{-1})$, $V(z)^{-1}=V(z^{-1})$. FIG. 6a depicts the scaling function associated with this $H_0(z)$ and the complex wavelet associated with $H_+(z)$ (solid line indicating the real part and broken line the imaginary part). FIGS. 6b-6c show the frequency responses (magnitude and phase) for $H_0(z)$ and $H_+(z)$, respectively.

Section 4 describes the modifications of the filter bank for the real-valued inputs as in FIG. 3a.

Lifting Approach

Figure 3D:
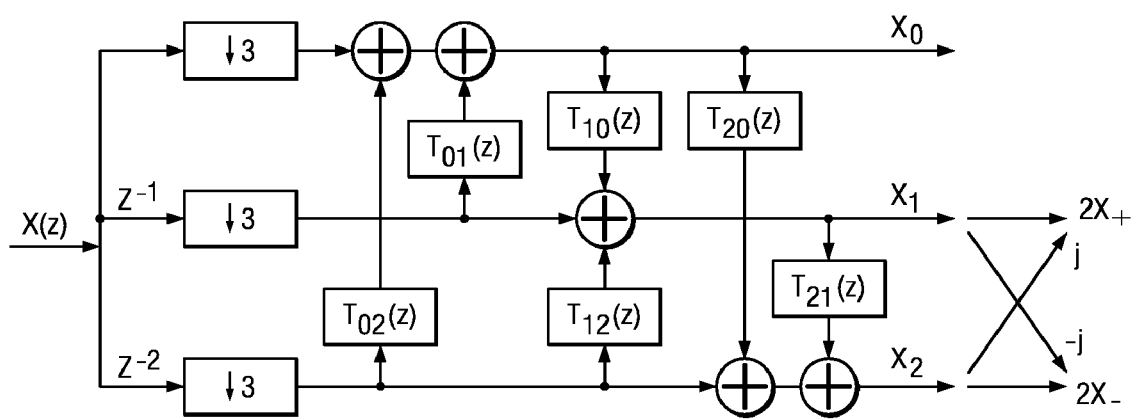

FIG. 3d shows an alternative filter bank construction using the lifting approach. In particular, the preferred embodiment approach first generates a real-valued filter bank of filters $H_0(z)$, $H_1(z)$, and $H_2(z)$ (analogous to the foregoing $\hat{E}(z)$) by the lifting method and then forms $H_+(z)$ and $H_-(z)$ as the complex conjugate pair $[H_1(z)\pm jH_2(z)]/2$. The lifting approach automatically provides a perfect-reconstruction synthesis filter bank that satisfies the third design constraint. The filters $T_{ij}(z)$ in FIG. 3d denote the lifting filters used to create the subband signals $X_0(z)$, $X_1(z)$, and $X_2(z)$. The lifting filters determine the analysis filters as:

$$H_0(z)=1+z^{-1} T_{01}(z^3)+z^{-2} T_{02}(z^3)$$

$$H_1(z)=z^{-1}+T_{10}(z^3) H_0(z)+z^{-2} T_{12}(z^3)$$

$$H_2(z)=z^{-2}+T_{20}(z^3) H_0(z) T_{21}(z^3) H_1(z)$$

As previously noted, the butterfly of $H_1(z)$ and $H_2(z)$ at the right edge of FIG. 3d converts to the $H_+(z)$ and $H_-(z)$ filters.

Figure 5A:
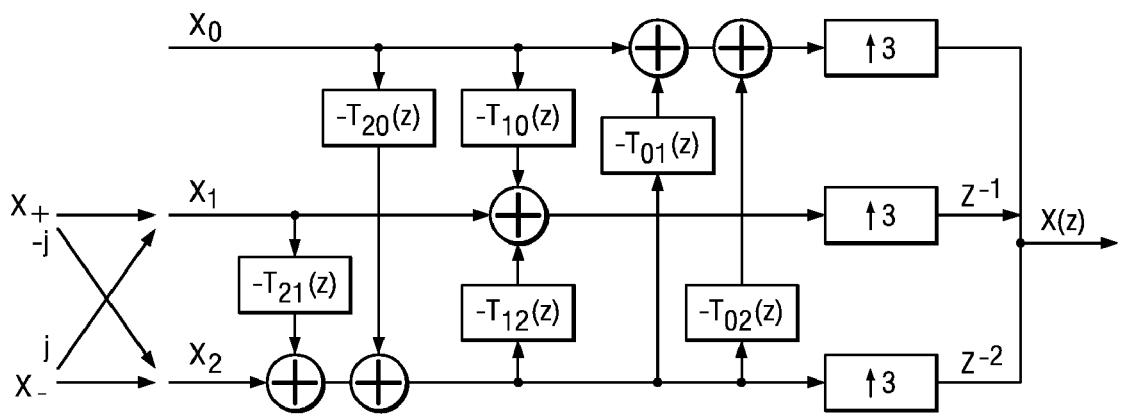
FIGS. 5a-5b are filter structures.

FIG. 5a shows the synthesis filter bank corresponding to the analysis filter bank of FIG. 3d.

To find suitable lifting filters, impose the existence and vanishing wavelet-moment criteria on the foregoing analysis filters and perform numerical optimization to obtain analysis filters with frequency responses approximating those shown in FIGS. 2a-2c. For example, a short filter set obtained using this approach is:

$$H_0(z)=0.5774+0.5774\ z^{-1}+0.5774\ z^{-2}$$

$$H_1(z)=-0.4349+0.5651\ z^{-1}+-0.1303\ z^{-2}$$

$$H_2(z)=-0.3333-0.3333\ z^{-1}+0.6667\ z^{-2}$$

Besides ensuring the existence of a synthesis filter bank, the lifting approach has two other practical advantages that are exploited in the design. First, the lifting approach corresponds to a lattice decomposition that enables a very efficient implementation. Second, the filter bank enjoys the cardinal interpolation property; this guarantees that no initialization error is incurred while using the filter bank.

4. One-Dimensional Non-Redundant Complex Wavelet Transform for Real Input

Creating the one-dimensional NCWT for real-valued inputs necessitates slight modifications to the filter banks of the previous section. Consider FIG. 3b and assume that the input $x(n)$ is a real-valued signal consisting of N real numbers. Since $H_0(z)$ has real coefficients, $x_0(n)$ has $N=3$ real numbers, while $x_+(n)$ and $x_-(n)$ each have $N=3$ complex numbers. However, because complex numbers have real and imaginary parts, the transform coefficients as $x_0(n)$, $x_+(n)$, and $x_-(n)$ require storage space for $5N/3$ real numbers. Therefore, for real-valued input, this transform is redundant because the transform coefficients require more storage space than the input signal.

To obtain a non-redundant transform for real-valued input, observe that $x_-(n)$ is the complex conjugate of $x_+(n)$, because $x(n)$ is real-valued and while $H_+(z)^*=H_-(z)$. Therefore $x_-(n)$ contains the same information as $x_+(n)$, and may be discarded because it is redundant. FIG. 3a shows the modified analysis filter bank for the one-dimensional NCWT after eliminating (indicated by broken lines) the $H_-(z)$ branch in the FIG. 3b filter bank. In this case, if $x(n)$ has N real numbers, then $x_0(n)$ and $x_+(n)$ have N/3 real numbers and N/3 complex numbers, respectively. The transform is now non-redundant because the input signal and transform coefficients each require the same amount of storage space. To reconstruct $X(z)$, generate $X_-(z)$ from $X_+(z)$ by setting $X_-(z)=X_+(z)^*$ and then using the synthesis filter bank associated with the one-dimensional NCWT of FIG. 3b and described previously. In practice, reconstruct $X(z)$ without generating $X_-(z)$ by use of $X_0(z)$ and the real and imaginary parts of $x_+(n)$ as input to the synthesis polyphase matrix $\hat{E}^H(z^{-1})S^H U(z^{-1})V(z^{-1})$.

Figure 5B:
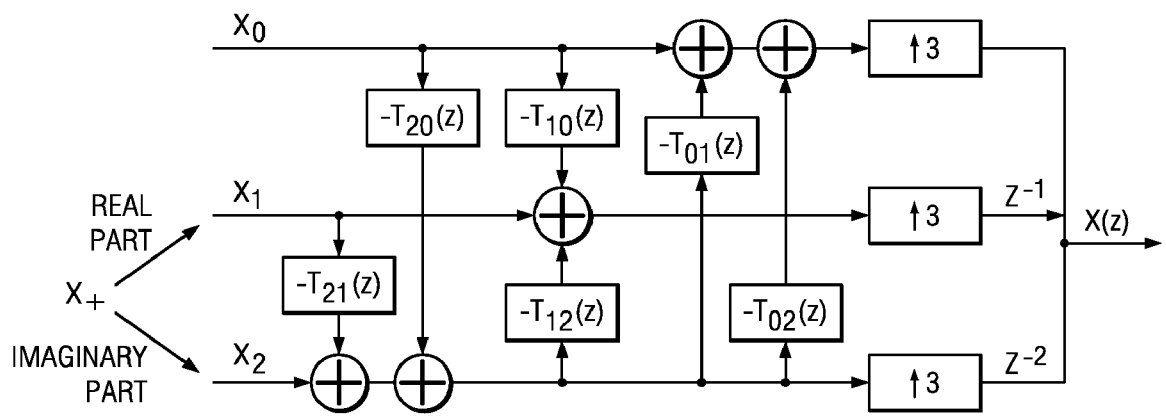

For the lifting approach, the analysis filter bank for real input simply discards the $X_-(z)$ output (retain only half of the butterfly); and the synthesis filter bank also separates the real and imaginary parts of $X_+(z)$ as inputs as illustrated in FIG. 5b.

5. Properties

The preferred embodiment two-dimensional NCWT has properties that may be useful for image/video processing.

Directionality: FIG. 7 shows the imaginary parts of the two-dimensional complex basis functions for the four directional wavelet subbands. As discussed in Section 2, the two-dimensional NCWT has higher directionality than the real wavelet transform. Specifically, the filters provide distinct basis functions for the 45-degree and the −45-degree subbands, in addition to vertical and horizontal basis functions.

Figure 8A:
FIGS. 8a-8c show an input image and corresponding vertical subband complex wavelet coefficients (magnitude and phase).
Figure 8B:

Magnitude coherence: FIG. 8b shows the magnitude of the first-level vertical subband of the two-dimensional NCWT of the Barbara image (FIG. 8a). The magnitudes successfully identify image regions with strong directional tendency. In addition (and unlike real wavelet coefficients), the magnitudes have a smooth envelope along edges.

Figure 8C:
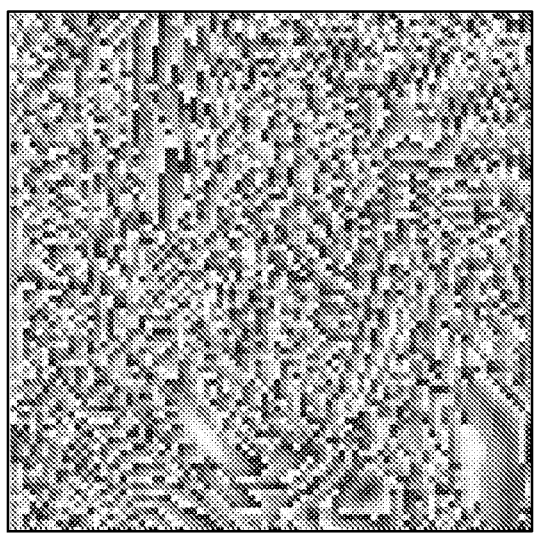
Figure 10:
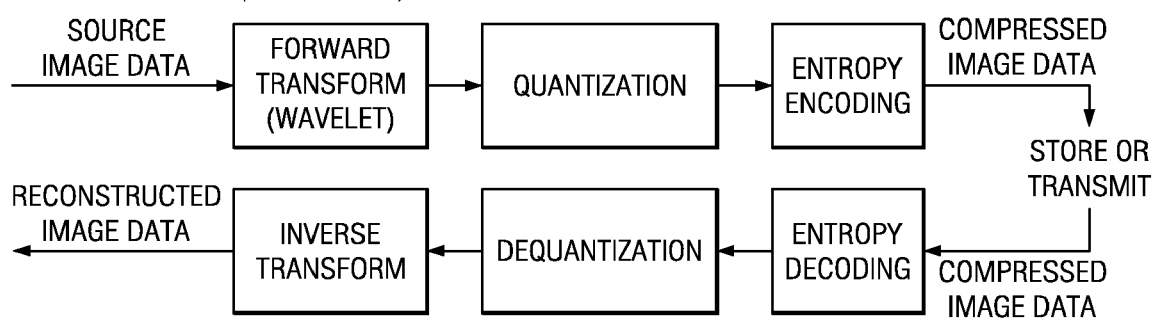
FIG. 10 shows image compression/decompression.

Phase coherence: Also shown in FIG. 8c are the phases of the complex coefficients of the first-level vertical subband of the two-dimensional NCWT of the Barbara image (FIG. 8a). In regions with strong directional tendency (i.e. where coefficient magnitudes are large), the phases typically demonstrate a degree of structure, or coherency.

The above properties suggest that the preferred embodiment two-dimensional NCWT may be well-suited to image processing and geometric modeling. For example, a zerotree compression algorithm could be developed based on coefficient magnitudes. Such techniques will require a nona-tree structure due to the triband filter bank: each complex coefficient will have 9 children (instead of 4, as with dual-band real wavelet transforms). In addition, the higher decimation provides greater frequency separation between wavelet scales (more than one octave), and so less depth will be needed in the tree.

6. Multiple Decomposition Levels

If more than one level of decomposition is required, such as to create a coefficient tree, store the lowpass subband, $X_{00}$, coefficients until image (tile component) has been filtered, and then repeat the two-dimensional transform on the lowpass subband. That is, the center square in FIG. 4b corresponds to the input for the next decomposition level.

7. Systems

The preferred embodiment methods are well-suited for environments which require continuous compression and storage of video or sequences of images which contain only partial spatial updates. FIGS. 9a-9b illustrates functional and system blocks of a preferred embodiment digital camera which includes the preferred embodiment JPEG2000 implementations; the encoding steps may be programmed into flash and/or ROM instruction memory for the processors shown in FIG. 9b (RISC, DSP, IMX, VLC).

8. Modifications

The preferred embodiments can be varied while maintaining the features of image wavelet transform based on a separable, three-band, non-redundant wavelet transform.

For example, the three filters of the one-dimensional filter bank could have various characteristics provided the passbands and stopbands approximate those of FIGS. 2a-2c ideals which limits aliasing connected with the downsampling by 3; differing filter designs provide differing approximations to these ideals with tradeoffs of the number of filter taps (filter length) required; and the filters used with respect to the first image dimension could differ from the filters used with respect to the second image dimension; the filters may be designed with various optimization criteria (see Tran et al section VI); the number of levels of two-dimensional decomposition can be varied which allows various depth zerotrees; and so forth.

What is claimed is:

1. An image transform method, comprising:
   (a) first filtering an input two-dimensional real-valued digital image with respect to a first dimension, said first filtering including a first lowpass filtering to yield a lowband and a first highpass filtering to yield a highband;
   (b) second filtering said lowband from step (a) with respect to a second dimension, said second filtering including a second lowpass filtering to yield a low-lowband and a second highpass filtering to yield a high-lowband; and
   (c) third filtering said highband from step (a) with respect to said second dimension, said third filtering including a third lowpass filtering to yield a low-highband, a third highpass filtering to yield a first high-highband, and a fourth highpass filtering to yield a second high-highband, wherein said third and fourth highpass filterings have impulse response z-transforms as complex conjugates.

2. The method of claim 1, wherein:
   (a) said first filtering is polyphase with 3 phases.

3. The method of claim 2, wherein:
   (a) said second and third filterings are each polyphase with 3 phases.

4. The method of claim 1, wherein:
   (a) said first lowpass filter has a passband approximating the frequency range $[-\pi/3, \pi/3]$ and said first highpass filter has a passband approximating the frequency range $[\pi/3, \pi/3]$ ; and
   (b) prior to said second filtering, downsampling said lowband by a factor of 3 with respect to said first dimension.

5. The method of claim 4, wherein:
   (a) after said second filtering, downsampling each of said low-lowband and said high-lowband by a factor of 3 with respect to said second dimension.

6. The method of claim 1, wherein:
   (a) prior to said third filtering, downsampling said highband by a factor of 3 with respect to said first dimension.

7. The method of claim 6, wherein:
   (a) after said third filtering, downsampling each of said low-highband, said first high-highband, and said second high-highband by a factor of 3 with respect to said second dimension.

8. The method of claim 1, wherein:
   (a) said first lowpass and first highpass filterings corresponds to a real scaling function and a complex wavelet, respectively.

9. The method of claim 1, further comprising:
   (a) repeating steps (a)-(c) of claim 1 for an input derived from said low-lowband.

10. A non-redundant, complex-wavelet transformer for two-dimensional images, comprising:
    (a) a first one-dimensional polyphase filter bank for input real-valued, two-dimensional digital images, said first filter bank with three phase filters and a lowpass output and a positive-frequency highpass output;
    (b) a second one-dimensional polyphase filter bank coupled to the lowpass output of said first filter bank, said second filter bank with three phase filters and a lowpass output and a positive-frequency highpass output; and
    (c) a third one-dimensional polyphase filter bank coupled to the highpass output of said first filter bank, said third filter bank with three phase filters and a lowpass output, a positive-frequency highpass output, and a negative-frequency highpass output.

11. The transformer of claim 10, wherein:
    (a) said first second, and third filter banks are implemented as programs on a programmable processor.

12. A digital camera, comprising:
    (a) a sensor;
    (b) an image pipeline coupled to said sensor, said image pipeline including an image compressor with
       (i) a first one-dimensional polyphase filter bank for input real-valued, two-dimensional digital images, said first filter bank with three phase filters and a lowpass output and a positive-frequency highpass output;
       (ii) a second one-dimensional polyphase filter bank coupled to the lowpass output of said first filter bank, said second filter bank with three phase filters and a lowpass output and a positive-frequency highpass output; and
       (iii) a third one-dimensional polyphase filter bank coupled to the highpass output of said first filter bank, said third filter bank with three phase filters and a lowpass output, a positive-frequency highpass output, and a negative-frequency highpass output.

13. The camera of claim 12, wherein:
    (a) said first, second, and third filter banks are implemented as programs on a programmable processor.

* * * * *